US012769538B2

(12) United States Patent
Sayyed et al.

(10) Patent No.: US 12,769,538 B2
(45) Date of Patent: Oct. 20, 2026

(54) INTELLIGENT SYSTEM BIOS FLASH UPDATE TRACKING

(71) Applicant: Dell Products L.P., Round Rock, TX (US)

(72) Inventors: Ibrahim Sayyed, Georgetown, TX (US); Alan H. Abdelhalim, Pflugerville, TX (US); Kenneth James Capps, Parker, TX (US)

(73) Assignee: Dell Products L.P., Round Rock, TX (US)

( * ) Notice: Subject to any disclaimer, the term of this patent is extended or adjusted under 35 U.S.C. 154(b) by 304 days.

(21) Appl. No.: 18/651,283

(22) Filed: Apr. 30, 2024

(65) Prior Publication Data

US 2025/0335179 A1 Oct. 30, 2025

(51) Int. Cl.
*G06F 8/654* (2018.01)
*G06F 9/4401* (2018.01)

(52) U.S. Cl.
CPC ............ *G06F 8/654* (2018.02); *G06F 9/4403* (2013.01)

(58) Field of Classification Search
CPC ............................... G06F 8/654; G06F 9/4403
USPC ........................................................ 717/168
See application file for complete search history.

(56) References Cited

U.S. PATENT DOCUMENTS

2013/0179871 A1* 7/2013 Nagao ........................ G06F 8/65 717/170
2014/0068597 A1* 3/2014 Hirahara ................. G06F 8/654 717/173
2014/0282480 A1* 9/2014 Matthew ................... G06F 8/65 717/172
2019/0317751 A1* 10/2019 Ramsay .............. G06F 9/45558
2019/0354153 A1* 11/2019 Hauser ....................... G06F 1/28
2020/0042391 A1* 2/2020 Pepper ................ G06F 11/1417
2020/0082090 A1* 3/2020 Samuel .................... G06F 8/654
2021/0011703 A1* 1/2021 Rajbharti ................ G06F 9/455
2021/0208869 A1* 7/2021 Nachimuthu ........... G06F 8/656
2021/0240463 A1* 8/2021 Stewart ................. G06F 21/572
2025/0238222 A1* 7/2025 Xiang ........................ G06F 8/65

* cited by examiner

*Primary Examiner* — Bradford F Wheaton
(74) *Attorney, Agent, or Firm* — Fogarty LLP

(57) ABSTRACT

Embodiments are directed to systems and methods for updating a Basic Input/Output System (BIOS) for an Information Handling System (IHS). In an illustrative, non-limiting embodiment, an IHS may receive a BIOS image with appended metadata, extract at least a portion of the metadata from the BIOS image, communicate information about metadata contents to an embedded controller via a telemetry service, evaluate prerequisites in the metadata against a current BIOS and IHS status, initiate a BIOS update if the prerequisites are satisfied, communicate information regarding BIOS update progress to the embedded controller via the telemetry service, and determine whether the BIOS update was successful after rebooting the IHS.

20 Claims, 6 Drawing Sheets

INTELLIGENT SYSTEM BIOS FLASH UPDATE TRACKING

BACKGROUND

As the value and use of information continues to increase, individuals and businesses seek additional ways to process and store information. One option is an Information Handling System (IHS), which may take the form of a server, laptop, or tablet, for example. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, enterprise data storage, global communications, etc. In addition, IHSs may include a variety of hardware and software components that may be configured to process, store, and communicate information and may include one or more computer systems, data storage systems, and networking systems.

In most IHS, low-level code is used as an intermediary between hardware components and the Operating System (OS), as well as other high-level software. In some IHSs, this low-level code is known as the Basic Input/Output System (BIOS) or service BIOS (SBIOS). The BIOS provides a set of software routines that allow high-level software to interact with hardware components using standard calls. A specification for creating code that is responsible for booting the IHS has been developed and that is called the Extensible Firmware Interface (EFI) Specification. The EFI Specification has been extended by the Unified Extensible Firmware Interface Forum (UEFI).

The EFI Specification describes an interface between the OS and the system firmware. In particular, the EFI Specification defines the interface that platform firmware must implement and the interface that the OS may use in booting. The EFI Specification also specifics that protocols should be provided for EFI drivers to communicate with each other. An EFI protocol is an interface definition provided by an EFI driver. The EFI core provides protocols for allocation of memory, creating events, setting the clock, etc.

UEFI Secure Boot is an industry-standard mechanism in the system BIOS for authenticating pre-boot code modules (e.g., device drivers or other software or firmware code). The UEFI specification defines data structures and logic for the authentication process. The BIOS maintains a Secure Boot policy having X.509 certificates, public keys, and image digests. The BIOS enforces the Secure Boot policy for each pre-boot code module that loads during the boot process. If a pre-boot code module cannot be authenticated or does not otherwise satisfy the Secure Boot policy, the BIOS does not load that module.

IHS Original Equipment Manufacturers (OEMs) regularly release BIOS flash updates to customers. The BIOS flash updates are essential and enhance system reliability, performance, security, and functionality. However, based on field data regarding BIOS versions that are in active use, the adoption rate for new BIOS updates across IHS systems averages roughly 40%. Some of the reasons for the low adoption rate include difficulty distributing the BIOS to users and raising awareness about the availability of the BIOS updates. It has been observed that publishing BIOS updates to the Windows Update service tends to increase installs/attempts. However, once the update is actually delivered to the device, a high install-failure rate still exists and has been observed to exceed 35,000 failures per day.

SUMMARY

Embodiments are directed to systems and methods for updating a Basic Input/Output System (BIOS) for an Information Handling System (IHS). In an illustrative, non-limiting embodiment, an IHS may receive a BIOS image with appended metadata, extract at least a portion of the metadata from the BIOS image, communicate information about metadata contents to an embedded controller via a telemetry service, evaluate prerequisites in the metadata against a current BIOS and IHS status, initiate a BIOS update if the prerequisites are satisfied, communicate information regarding BIOS update progress to the embedded controller via the telemetry service, and determine whether the BIOS update was successful after rebooting the IHS.

In some embodiments, the metadata comprises one or more of the following segments: signed information, metadata format version, source application identifier, application version, timestamp, minimum BIOS version required, minimum Operating System (OS) security score, criticality, and additional software list.

In some embodiments, the BIOS image with appended metadata is received by an IHS Operating System (OS) via a software update application. In some embodiments, the BIOS image with appended metadata is received by an IHS OS via an Over The Air (OTA) software update service. In some embodiments, the IHS verifies the contents of the metadata using signed information in the metadata.

In some embodiments, the embedded controller manages a BIOS update process. In some embodiments, the IHS reports BIOS update progress and BIOS update events to a backend service.

In some embodiments, the IHS determine that the prerequisites are not satisfied and initiates one or more remediations to conform a current BIOS and a current OS to meet the prerequisites.

In some embodiments, the IHS receives notice that a user has not allowed the BIOS update, determines whether to prompt the user to reinitiate the BIOS update based on criticality of the update, and schedules a BIOS update retry attempt with the user.

In some embodiments, the IHS determines that the BIOS update was not successful, initiates corrective actions to address a cause of BIOS update failure, and initiates one or more BIOS update retry attempts. In some embodiments, the IHS determines a cause of BIOS update failure locally at the IHS and initiates the corrective actions at the IHS.

In some embodiments, the IHS reports BIOS update events to a backend service, determines a cause of a BIOS update failure at the backend service, and initiates the corrective actions at the backend service.

In some embodiments, the IHS identifies one or more additional software applications listed in the metadata and downloads the additional software applications via a software update service.

In an illustrative, non-limiting embodiment, an IHS comprises a processor, an embedded controller, and a memory coupled to the processor, the memory having program instructions stored. When the program instructions are executed by the processor, the OS: receives a BIOS image with appended metadata, extracts at least a portion of the metadata from the BIOS image, communicate information about metadata contents to the embedded controller via a telemetry service, evaluate prerequisites in the metadata against a current BIOS and OS status, initiate a BIOS update if the prerequisites are satisfied, communicate information regarding BIOS update progress to the embedded controller via the telemetry service, determining that the BIOS update was not successful, initiating corrective actions to address a cause of BIOS update failure, and initiating one or more BIOS update retry attempts.

In some embodiments, the metadata comprises one or more of the following segments: signed information, metadata format version, source application identifier, application version, timestamp, minimum BIOS version required, minimum OS security score, criticality, and additional software list.

In some embodiments, the program instructions further cause the OS to verify the contents of the metadata using signed information in the metadata.

In some embodiments, the embedded controller is configured to manage a BIOS update process.

In some embodiments, the telemetry service is configured to report BIOS update progress and BIOS update events to a backend service.

In some embodiments, the program instructions further cause the OS to identify one or more additional software applications listed in the metadata and to download the additional software applications via a software update service.

In some embodiments, the program instructions further cause the OS to determine that the BIOS image is a critical update and to prompt a user to reinitiate the BIOS update based on criticality of the update.

BRIEF DESCRIPTION OF THE DRAWINGS

Figure 1:
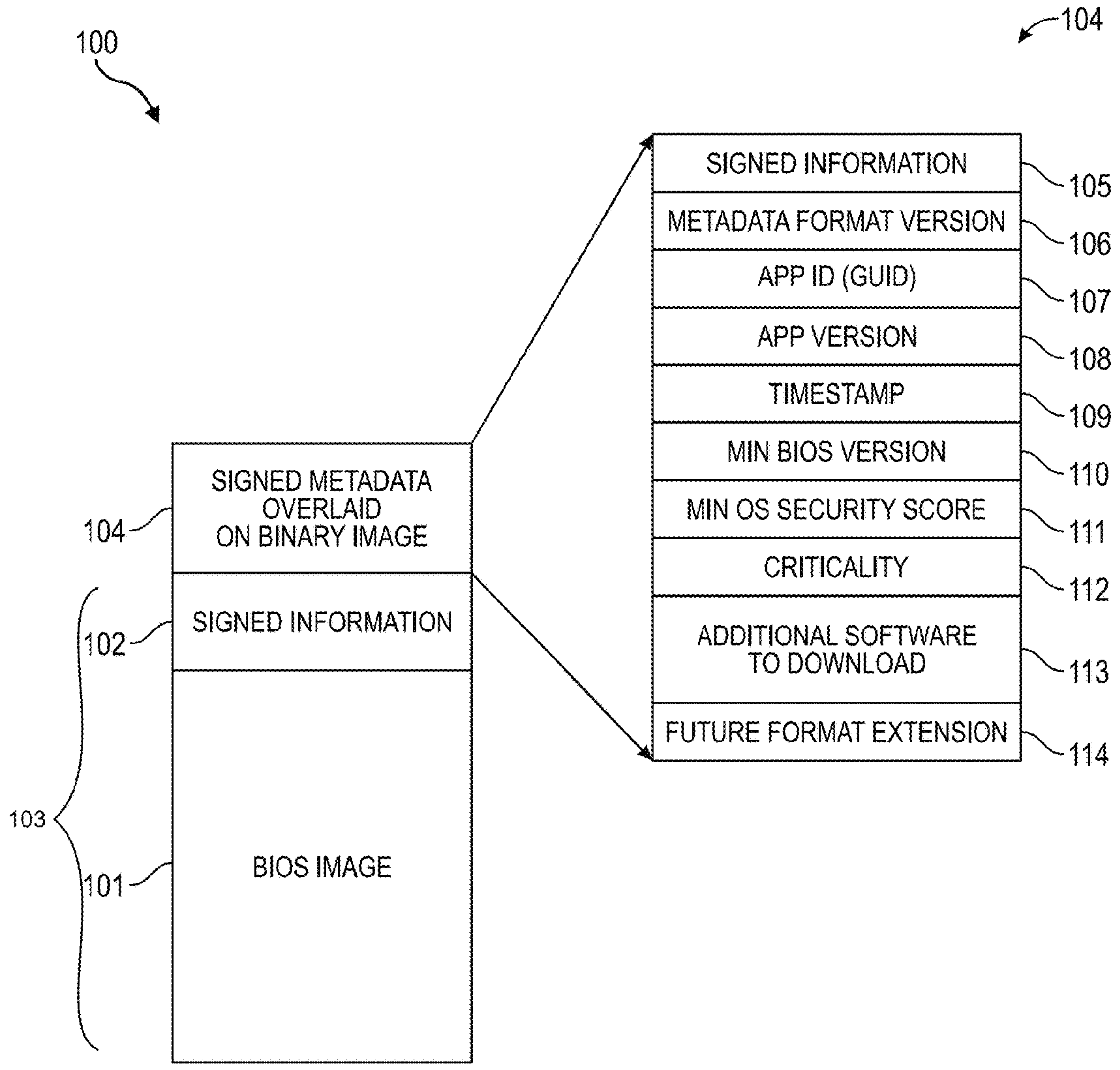

Having thus described the invention in general terms, reference will now be made to the accompanying drawings, which are not necessarily drawn to scale, and wherein:

FIG. 1 illustrates a BIOS update package according to an example embodiment.

Figure 2:
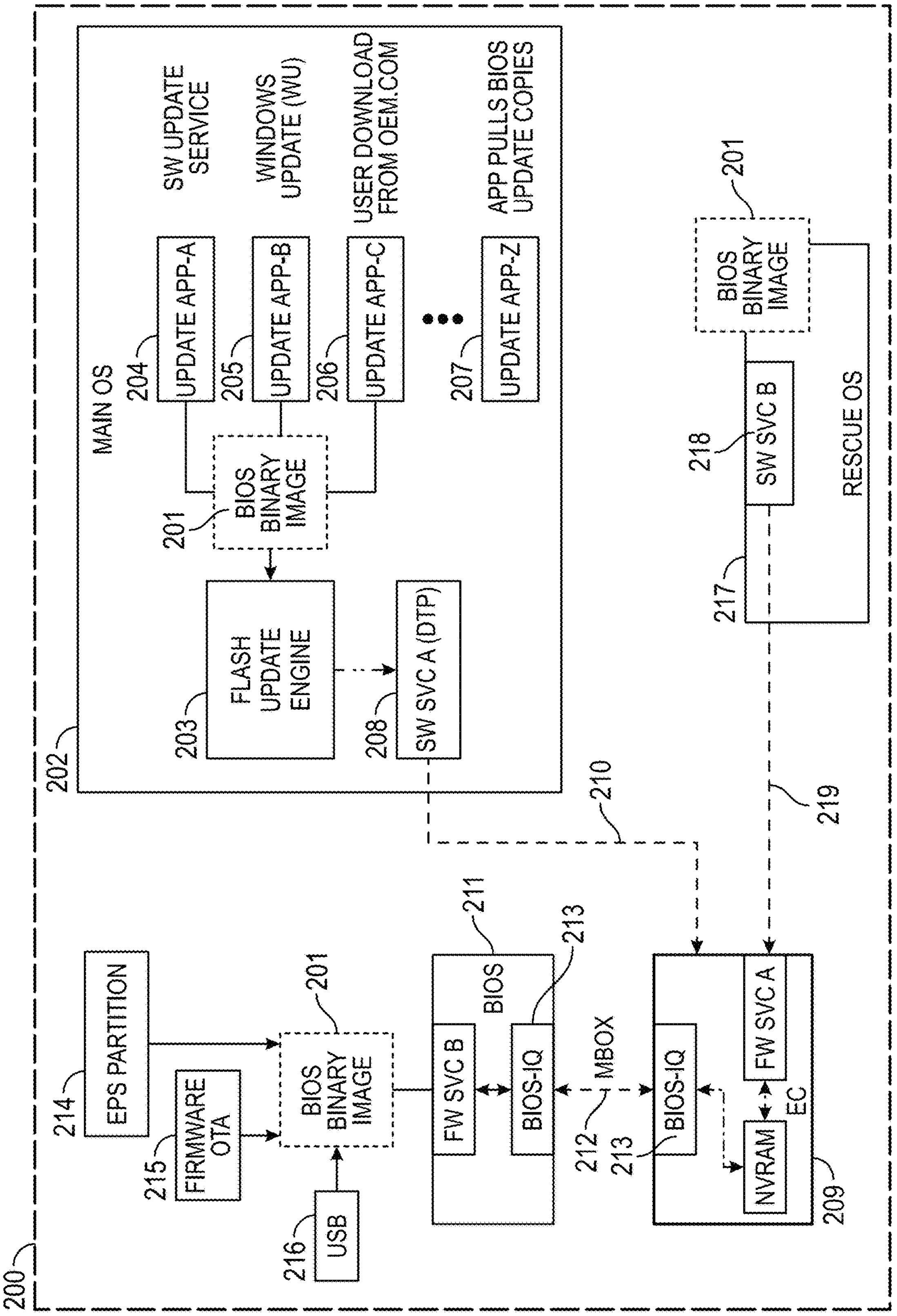

FIG. 2 illustrates high level system flows and communications in an IHS for BIOS updates.

Figure 3:
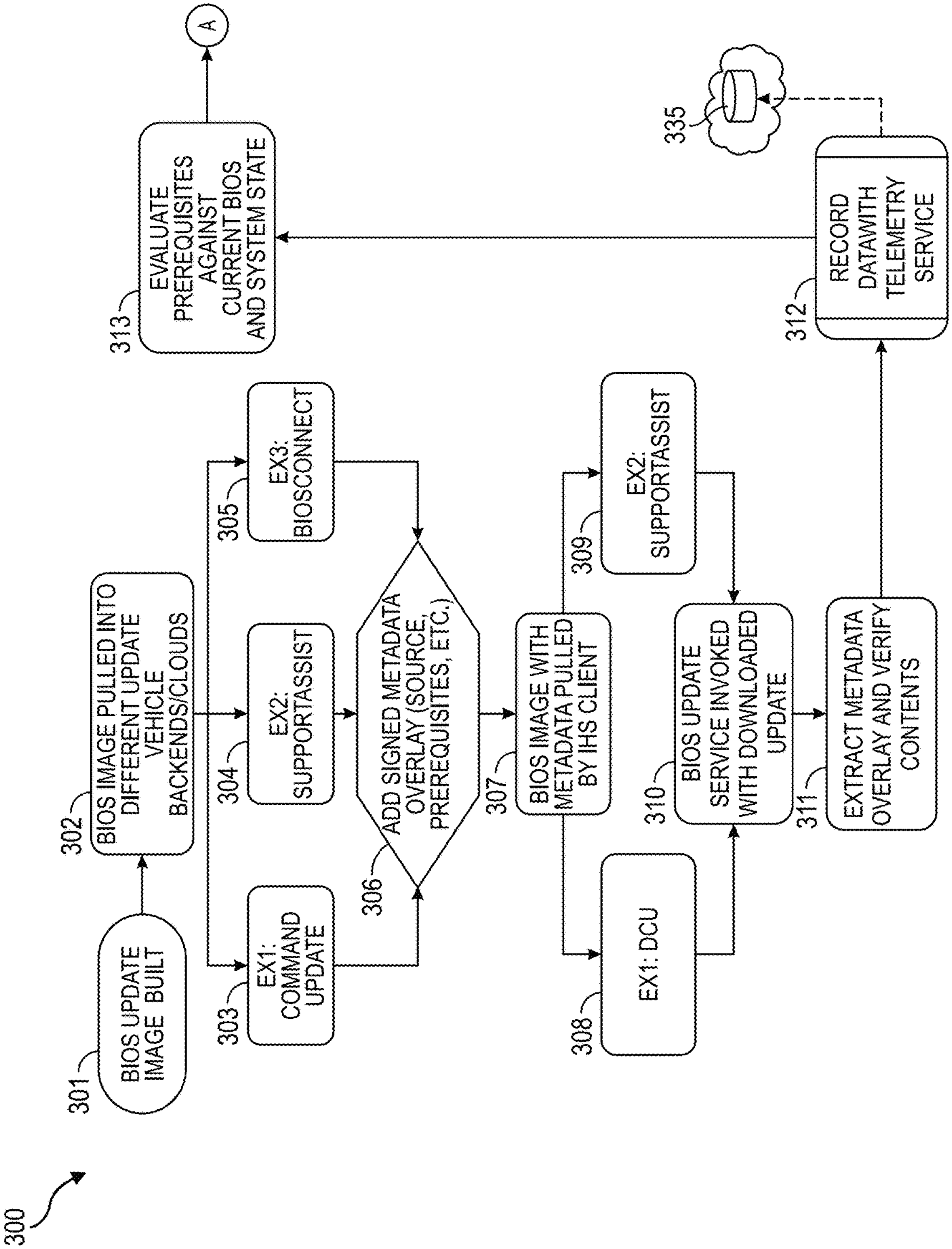
Figure 3:
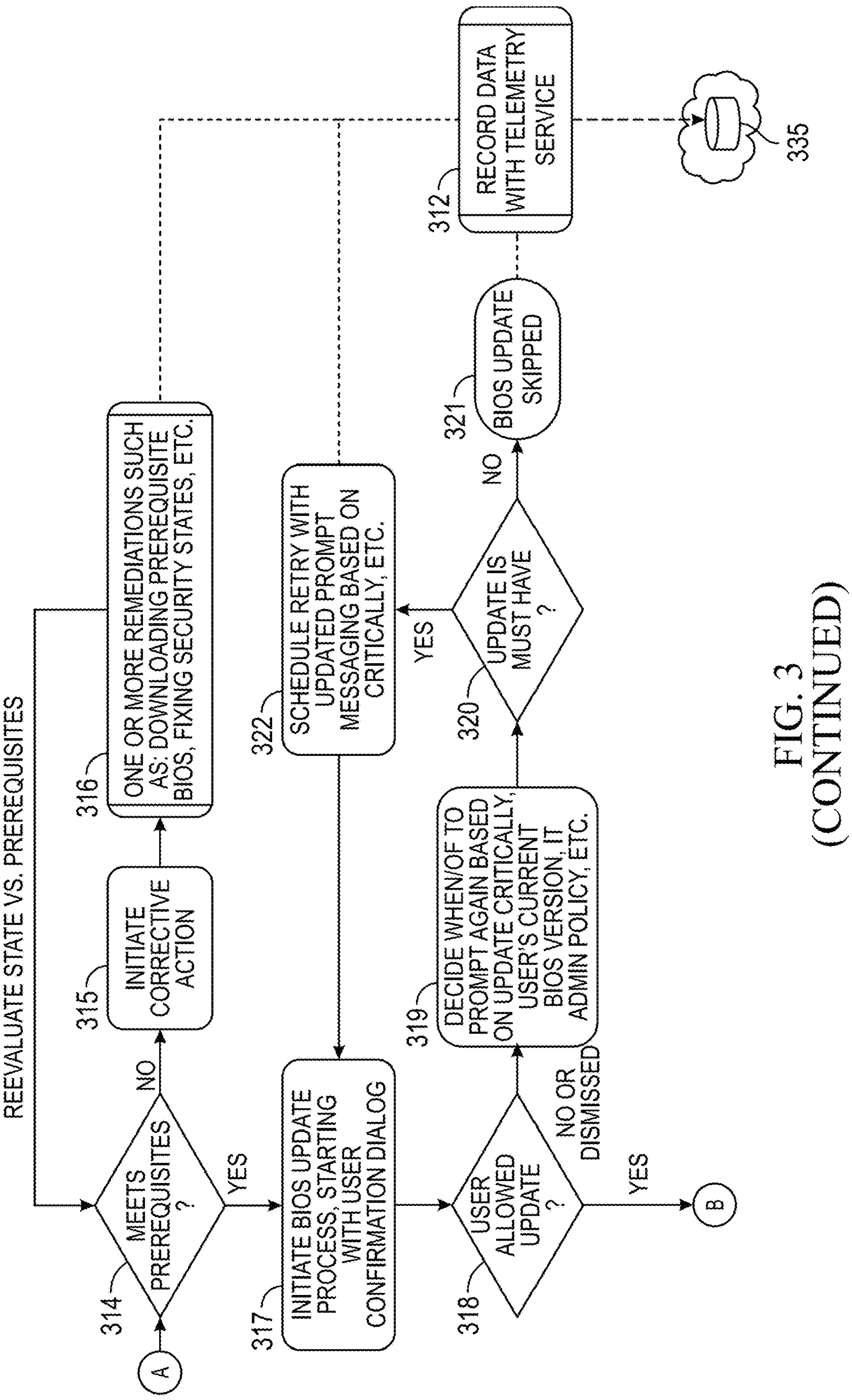
Figure 3:
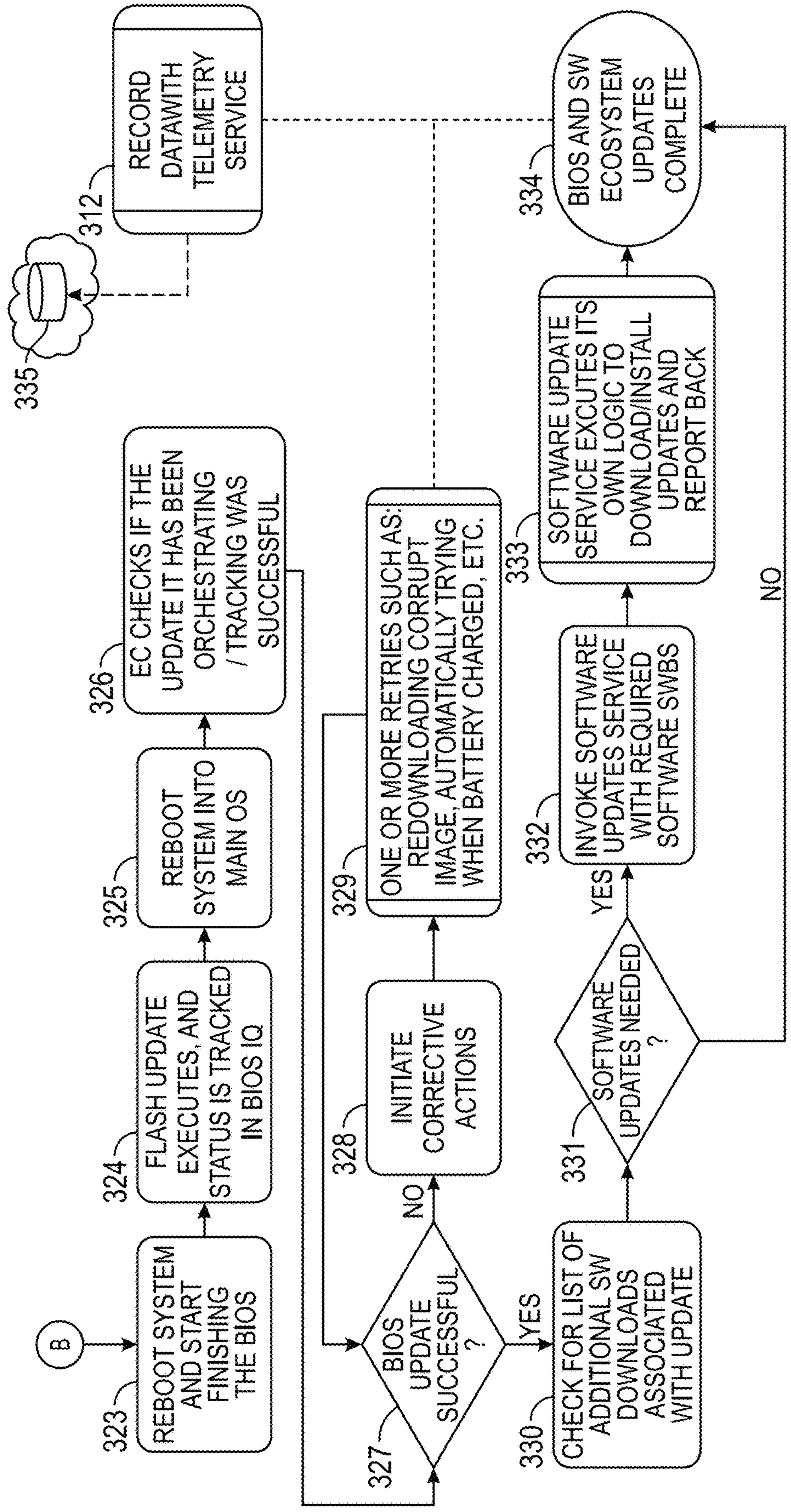

FIG. 3 is a flowchart illustrating a workflow for a BIOS update driven by the main operating system of an IHS.

Figure 4:
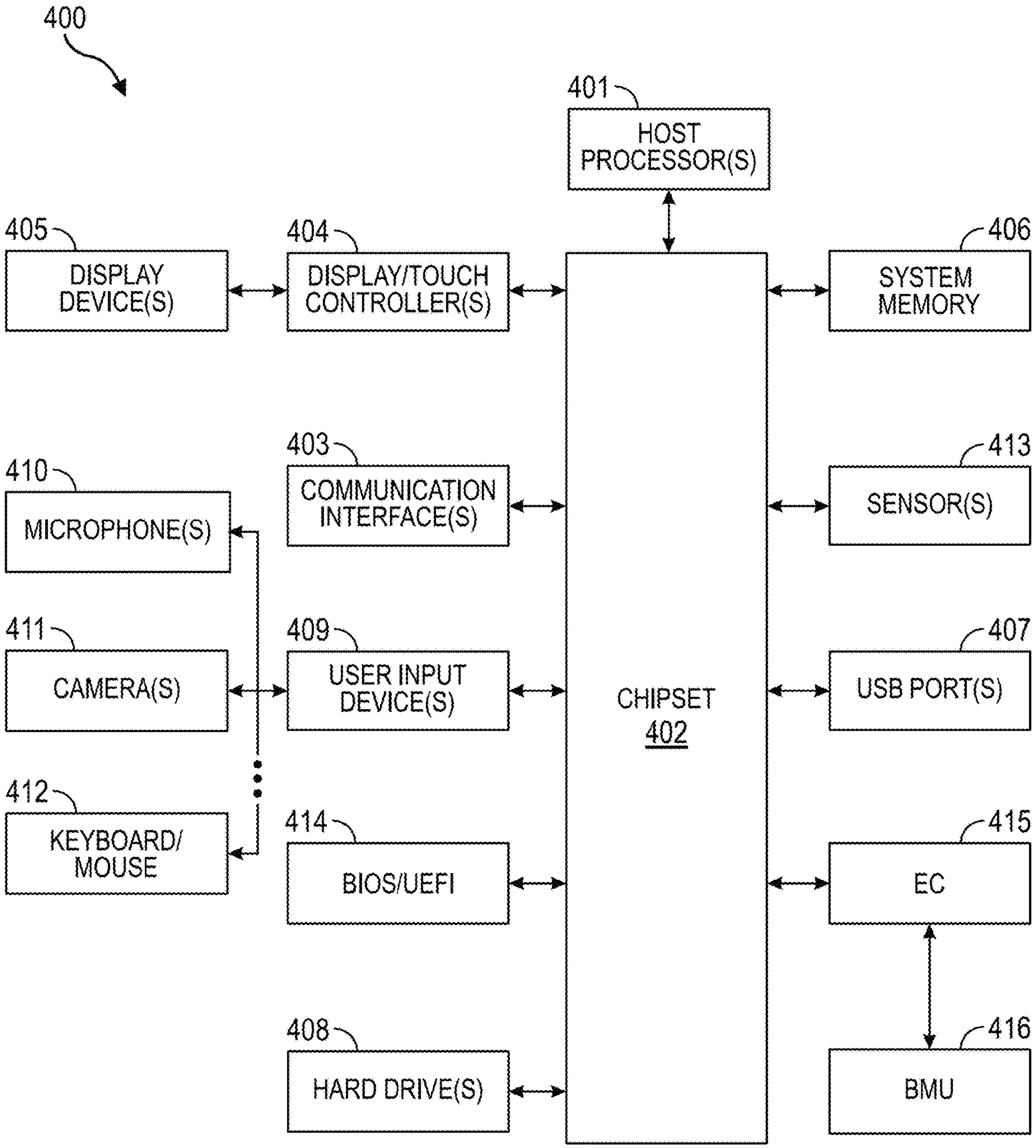

FIG. 4 is a diagram illustrating examples of components of an IHS according to some embodiments.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The embodiments disclosed herein provide a novel, closed-loop method to allow tracking of the distribution of a BIOS update and its delivery vehicle, to report success or errors encountered in the BIOS's application, and to take corrective actions, if necessary, both on a physical IHS or in the cloud. Additionally, after a successful BIOS update, the method triggers the installation and/or updating of any accompanying software that can leverage the newly updated BIOS features and enhancements to maximize the benefits of the update.

It is difficult to improve the adoption and success rates for current BIOS updates because there is no robust, closed-loop mechanism in place to track the download and delivery of these BIOS updates and to track whether the user has chosen to install the BIOS updates once received. Additionally, for attempted updates, current systems reboot and hand off to BIOS to apply the update. Only basic telemetry data (e.g., BIOS-IQ data) is available regarding the result. Mechanisms are not available to analyze failures and take corrective actions to allow the updates to successfully complete. Finally, some BIOS updates require original equipment manufacturer (OEM) software to be updated as well to leverage BIOS enhancements. These issues pose several challenges to OEMs because customers may be running outdated BIOS versions that have known performance issues that will impact the customer's experience and may expose security vulnerabilities that put customers at risk.

The solution disclosed herein adds signed metadata as an overlay to the BIOS update package. The metadata contains information about the criticality of the update, its delivery vehicle, any restrictions/prerequisites, additional software to install/update after BIOS installation success, etc. The installation of the BIOS update is then tracked via a collaboration between the embedded controller (EC) and a telemetry service in the host or service OS, which track and report the update metadata along with flash update success/failure/ignore information. The information is communicated back to an OEM cloud as well as to the on-the-server flash update service. Any flash update failures are analyzed and, where appropriate, corrective actions are performed to enable the update to succeed. The corrective actions may include, for example, re-downloading the update or installing prerequisite BIOS versions. Any user actions that dismiss/cancel a BIOS update are evaluated against the criticality of the update and, if appropriate, the user or IT admin is notified at a later time based on urgency to allow or schedule the update to occur.

FIG. 1 illustrates a BIOS update package 100 according to an example embodiment. BIOS update package 100 includes a BIOS image 101 and signed information 102. These sections are part of existing BIOS update packages 103. Signed metadata 104 is added to package 100 as an overlay on the binary image 103. In other configurations, the metadata 104 may be associated with the BIOS update 103 in various ways. Metadata 104 may be available in an alternative file stream, in another file resource, in an extra file included with the BIOS package 103. Metadata 104 may be added by an OEM for its customers, by a BIOS update service for its users, or by a third party.

FIG. 1 further illustrates an expanded metadata segment 104 showing the type of content that may be included as metadata. Signed information segment 105 may include data that authenticates the validity and/or source of the metadata segment 104. Metadata format version 106 may identify a format used to compile and organize metadata 104. Application identifier 107 identifies the source application that created or provided metadata 104, which may be associated with a globally unique identifier (GUID). Application version 108 identifies which version of the source application created the metadata 104. The time of creation for the metadata segment is included in segment 109.

Minimum BIOS version required segment 110 lists the oldest prior version of the BIOS that the BIOS package 103 is intended to replace. Earlier version of the BIOS may need to be updated to an intermediate version of BIOS before installing BIOS package 103. Similarly, a minimum operating system (OS) version may be included in metadata 104. The minimum OS security score 111 indicates a required level security that the BIOS package 103 expects from the operating system before installation. Criticality segment 112 indicates a relative importance for BIOS package 103. For example, if BIOS package 103 is intended to address a known system vulnerability, then a high criticality score would be indicated. The criticality level may be used to determine how often the system should attempt to install BIOS package 103 if an install failure occurs. Additional software download segment 113 lists other software that should be downloaded to the system to take advantage of features or improvements offered by BIOS package 103. Additional fields may also be included to address future improvements or innovations in extension segment 114.

As shown in FIG. 1, metadata 104 is added to the binary file 103. In one embodiment, the format of metadata 104 may be a structured format adapted for storing the metadata within the BIOS package file, such as a JSON blob. An example JSON blob for metadata 104 is:

```
Overlay_Metadata=
{
"MetadataFormatVersion": "YY.YY.YY",
"OverlayAppName": "BIOSservice",
"OverlayTimestamp": "2023-09-13",
"MinBiosVersion": "1.3.4",
"Criticality": "Urgent",
"AdditionalSWDownloads": "SWB12345, SWB67890"
```

FIG. 2 illustrates high level system flows and communications in an IHS 200 for BIOS updates. In various configurations, the BIOS binary image 201, with metadata included, for an updated BIOS package may be provided from different sources. The main OS 202 is executing on a system processor and includes a flash update engine module 203, such as a flash utility. A BIOS binary image 201 may be received by main OS 202 using different channels supported by BIOS update applications 204-207. Update application 204 is configured to receive BIOS updates from a third-party update service. Update application 205 is configured to receive BIOS updates from the Windows Update (WU) service provided by Microsoft for the Microsoft Windows operating system. The WU service automates downloading and installing software updates over the Internet. Update application 206 is configured to access a website, such as an OEM website, to obtain software updates. Update application 207 may be an intelligent application that pulls BIOS updates when they are available.

Once received through any of channels 204-207, BIOS image 201 is provided to flash update engine 203, which starts the update. Flash update engine 203 uses a software service 208 to communicate with EC 209 via telemetry 210 (e.g., DTP). Flash update engine 203 extracts the metadata from BIOS image 201 and communicates the metadata information to EC 209 via telemetry service 208. This allows EC 209 to track that BIOS update 201 has been delivered, note its source, criticality, etc. and that IHS 200 is about to attempt installing BIOS update 201.

Flash update engine 203 inspects metadata segment information regarding security, prerequisites, criticality, etc., Since the update operation is executing from main OS 202, flash update engine 203 also checks device security score, current BIOS version, and other attributes against the metadata prerequisites for the update. Telemetry service 208 records information about the flash update attempt and the source that delivered the BIOS image 201.

If all prerequisites are met or are in an acceptable range, then engine 203 proceeds with flash update operation. If a user declines the BIOS update, such as by dismissing a BIOS update prompt, then main OS 202 uses the BIOS image metadata, such as the criticality segment, to determine an urgency of the update. Main OS 202 then determines the age of the current BIOS version, refers to an IT admin policy, etc. to determine when and if the user should be reminded and urged to accept the BIOS update. This will depend on whether the BIOS update is deemed important for security or performance considerations. The frequency of notifications or reminders may be set by a system policy and may vary based on the type of user or other factors. When IHS 200 belongs to an individual or small/medium business, then the BIOS-update reminder notification is sent to the end-user, such as by visual notifications (e.g., pop-up messages). When IHS 200 is part of a large business or enterprise, then the BIOS-update notification may be sent to an administrator's console via a cloud connection or the Internet.

One the BIOS update is approved by the user, the IHS system 200 reboots and the flash update starts. The BIOS is stored on flash memory 211. EC 209 communicates with BIOS 211 via a communication channel 212, such as an embedded controller MBOX channel. BIOS-IQ 213 inside EC 209 tracks the flash update progress over MBOX 212.

Upon the next reboot, telemetry service 208 in OS 202 listens to notifications from EC 209 regarding flash update success or fail events. Telemetry service 208 or OS 202 uploads the BIOS-update results to backend systems along with any previous update attempts.

If the BIOS update attempt failed, then main OS may use the failure codes to prompt the user to take corrective actions to allow the update to be installed. For example, the user may be prompted to redownload a new BIOS image to replace a corrupt BIOS, install any prerequisite BIOS versions before attempting the current BIOS update, wait for battery charge to be above a required threshold with the device plugged in, etc.

Once the BIOS update is successful, the Additional Software to Download field 113 in metadata 104 can be examined to identify any software or versions used or recommended by the BIOS. A software update service, such as update App 204, in main OS 202 may be invoked to download and install specified software versions needed to leverage any newly introduced or enhanced BIOS features.

In other configurations, the updated BIOS binary image 201 may originate from other sources instead of the main OS update services 204-207. For example, BIOS contents may be stored within an EFI system partition (ESP) 214 of a computer-readable storage device in IHS 200. In some cases, such as during a system recovery, BIOS flash 211 may use an extractor to securely extract the zipped BIOS contents stored in the ESP partition 214.

In other configurations, a BIOS feature application, such as BIOSConnect from Dell Inc., provides a support network that enables the BIOS to perform a firmware update over the air (OTA) 215. The OTA application delivers the updated BIOS image 201 to the edge and runs it.

A user can also download the BIOS 201 to a USB drive 216 and then manually initiate the BIOS update via a BIOS menu option.

For BIOS updates received directly at BIOS 211, flash update mimics the telemetry service functionality. It extracts the metadata from BIOS binary image 201 and communicates the metadata information directly to EC 209 (e.g., using BIOS-IQ 213). This provides tracking similar to the main OS BIOS-update scenario.

Flash update inspects the metadata descriptor information regarding security, prerequisites, criticality, etc. Flash update also checks the IHS device's security score, current BIOS version, and other attributes in the BIOS environment against the prerequisites required for the BIOS update. If all prerequisites are met and/or are in an acceptable range, flash update proceeds with flash update operation, which begins with the system doing a warm reboot.

Flash update starts and BIOS-IQ 213 inside EC 209 tracks the flash update progress over MBOX 212. Upon the next reboot, EC 209 creates an event and notifies the telemetry service 210 (e.g., DTP) on the next main OS 202 boot. The telemetry SW SVC further communicates this event to backend systems. In addition, EC 209 can also upload this information to the backend using various sideband connectivity paths.

If the BIOS update failed, the failure codes are used to enact whatever recovery mechanisms are possible in the BIOS environment or to trigger boot to Recovery OS 217, if needed, for logic that cannot run in this environment.

Once the BIOS update is successful, flash update triggers a boot into main OS 202 or to recovery OS 217 and passes to a software update service any list of additional software to download or update as specified in the metadata.

Alternatively, BIOS binary image 201 may be available from a rescue OS 217 used during a system recovery. The rescue OS 217 uses a software service 218 to communicate with EC 209 via telemetry 219. EC 209 tracks BIOS updates delivered from rescue OS 217 and tracks any attempt to install BIOS update 201.

FIG. 3 is a flowchart illustrating a workflow 300 for a BIOS update driven by the main operating system of an IHS. At 301, a BIOS update image is built. The BIOS update may be created, for example, to fix bugs, add security updates, or to add compatibility for new devices. At 302, the BIOS update image is added to various BIOS update services, which may be available to users via backend communications or via a public or private cloud. Blocks 303-305 indicate various options for BIOS updates. At 304, a standalone application, such as Command Update from Dell Inc., provides updates for system software. At 305, a pre-installed service on an IHS, such as SupportAssist from Dell Inc., can indicate when updates are needed and provides support, repair, and troubleshooting. At 306, a network-based boot recovery capability, such as BIOSConnect, can provide assistance when the IHS is unable to boot.

At 306, signed metadata, such as metadata 104 (FIG. 1), is added as an overlay to the BIOS image built at 301. The metadata may be added by one of the BIOS services 303-305 or any other channel for BIOS updates. The metadata may include, for example, a source identifier for one of the channels 303-305, BIOS and OS prerequisites for installing the update, additional software required/suggested, etc. as provided in fields 105-113.

At 307, the BIOS image with the metadata overlay is downloaded or otherwise obtained by a client on an IHS that identifies a need for a BIOS update. For example, the BIOS image may be pulled by a utility on the IHS that allows users to keep the drivers, BIOS, and firmware on the IHS up-to-date, such as Dell Command Update (DCU) 308. Alternatively, a tool that automatically scans the IHS to detect updates available for drivers, BIOS, and applications, such as Dell SupportAssist 309, may be used to pull the BIOS image. Once the BIOS update is downloaded, at 310 a BIOS update service is invoked on the IHS.

At 311, the signed metadata is extracted from the downloaded BIOS image and the contents are verified. At 312, the IHS begins recording data regarding the BIOS update using a telemetry service. The recorded data may include detailed telemetry that tracks attempts, results, failures or other events related to the BIOS update. This data may be saved to a cloud service 335 where it can be accessed by the user, data center administrator, OEM, BIOS manufacturer or any other party that needs to monitor the status of the BIOS update and/or has an interest in learning how the BIOS updates are performing across a number of IHSs.

At 313, the BIOS update service evaluates any BIOS prerequisites against the current BIOS, OS, and system state. At 314, the system is evaluated as to whether the prerequisites are met. If the prerequisites are not met, then the process moves to 315 where corrective actions are initiated. At 316, the remediations may include, for example, downloading a previous BIOS version, updating an OS version, fixing security states or vulnerabilities, etc. Any remediations implemented are reported to telemetry service 312 so that the event can be recorded for future analysis and tracking. Once the corrective actions have been addressed, the process returns to 314 to reevaluate whether all the prerequisites have been met.

If the prerequisites are met at 314, then the process moves to 317 and initiates the BIOS update process. The process will typically start with a user dialog to confirm that the BIOS should be updated and to provide user instructions, such as warnings to not turn off the IHS during the update. At 318, the BIOS update service determines whether the user allowed the BIOS update. If the user declined or canceled the update in response to the user dialog at 318, then the process moves to 319 and the BIOS update service determines whether to prompt the user again to start the BIOS update. That determination may be based on the criticality of the update, the current BIOS version, IT or datacenter administrator policy, etc. At 320, if the BIOS update is not critical, then the process moves to 321 and the BIOS update is skipped and notification is provided to telemetry service 312 of the update cancelation so that the event can be recorded for future analysis and tracking.

At 320, if the BIOS update is determined to be critical, then the process moves to 322 and an update retry is scheduled, which will use amended user prompt messaging that more clearly indicates the critical issues that are addressed by the updated BIOS. Notification is also provided to telemetry service 312 documenting the scheduled BIOS update retry so the event can be recorded for future analysis and tracking. The process then returns to 317 and reinitiates the BIOS update process, and, at 318, the BIOS update service again determines whether the user will allow the BIOS update.

If the user accepts the update at 318 in response to the user dialog, then the process moves to 323 to start flashing the BIOS and rebooting the system and. At 324, the flash update executes and the EC tracks the update status via BIOS IQ. At 325, the system reboots into the main OS. At 326, the EC checks whether the update has been orchestrating and tracking successfully. At 327, the BIOS update service determines whether the update was successful.

If the BIOS update is not successful at 327, then at 328 the BIOS update service initiate corrective action. At 329, one or more update retries are attempted after the corrective action is taken. Corrective action may include, redownloading the BIOS binary to replace a corrupt binary, reattempting the update when the battery is charged and/or the device is plugged in, etc. Notification is provided to telemetry service 312 to document the retry events. After the retry, the bios update success is evaluated again at 327.

If the BIOS update is successful, then, at 330, the BIOS update service checks the metadata for additional software downloads that are required or recommended to take full advantage of the BIOS update. At 331, a determination is made as to whether the software updates are needed. This determination may involve a dialog with the user and/or may be decided by the BIOS update service based on an IT policy, for example. If the software updates are needed, then, at 332, a software update service is invoked to obtain the software, such as by requesting that the update service obtain software with certain identifiers (SWBs). At 333, the software update service downloads and installs the software updates. At 334, the BIOS update and any required software updates are complete. If no additional software updates are needed at 331, then the process moves straight to 334 to complete the update. Completion of the BIOS update and updates of the software environment is reported by telemetry service 312.

In some embodiments, notifications sent to telemetry service 312 are stored locally until the BIOS update is complete or canceled and then the various notifications for each step are sent as a group to cloud service 335.

FIG. 4 is a block diagram illustrating components of IHS 400. As depicted, IHS 400 includes one or more host processor(s) 401. In various embodiments, IHS 400 may be a single-processor system, or a multi-processor system including two or more processors. Host processor(s) 401 may include any processor capable of executing program instructions, such as an INTEL/AMD x86 processor, or any general-purpose or embedded processor implementing any of a variety of Instruction Set Architectures (ISAs), such as a Complex Instruction Set Computer (CISC) ISA, a Reduced Instruction Set Computer (RISC) ISA (e.g., one or more ARM core(s), or the like).

IHS 400 includes chipset 402 coupled to host processor(s) 401. Chipset 402 may provide host processor(s) 401 with access to several resources on IHS 400. In some cases, chipset 402 may utilize a QuickPath Interconnect (QPI) bus to communicate with host processor(s) 401. Chipset 402 may also be coupled to communication interface(s) 403 to enable communications between IHS 400 and various wired and/or wireless networks, such as ETHERNET, WIFI, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like.

Communication interface(s) 403 may be used to communicate with peripherals devices (e.g., BT speakers, headsets, etc.). Moreover, communication interface(s) 403 may be coupled to chipset 402 via a Peripheral Component Interconnect Express (PCIe) bus, or the like.

Chipset 402 may be coupled to display and/or touchscreen controller(s) 404, which may include one or more Graphics Processor Units (GPUs) on a graphics bus, such as an Accelerated Graphics Port (AGP) or PCIe bus. As shown, display controller(s) 404 provide video or display signals to one or more display device(s) 405.

Display device(s) 405 may include Liquid Crystal Display (LCD), Light Emitting Diode (LED), organic LED (OLED), or other thin film display technologies. Display device(s) 405 may include a plurality of pixels arranged in a matrix, configured to display visual information, such as text, two-dimensional images, video, three-dimensional images, etc. In some cases, display device(s) 405 may be provided as a single continuous display, rather than two discrete displays.

Chipset 402 may provide host processor(s) 401 and/or display controller(s) 404 with access to system memory 406. In various embodiments, system memory 406 may be implemented using any suitable memory technology, such as static RAM (SRAM), dynamic RAM (DRAM) or magnetic disks, or any nonvolatile/Flash-type memory, such as a Solid-State Drive (SSD), Non-Volatile Memory Express (NVMe), or the like.

In certain embodiments, chipset 402 may also provide host processor(s) 401 with access to one or more USB ports 407, to which one or more peripheral devices may be coupled (e.g., integrated or external webcams, microphones, speakers, etc.).

Chipset 402 may further provide host processor(s) 401 with access to one or more hard disk drives, solid-state drives, optical drives, or other removable-media drives 408.

Chipset 402 may also provide access to one or more user input devices 409, for example, using a super I/O controller or the like. Examples of user input devices 409 include, but are not limited to, microphone(s) 410, camera(s) 411, and keyboard/mouse 412. Other user input devices 409 may include a touchpad, stylus or active pen, totem, etc. Each of user input devices 409 may include a respective controller (e.g., a touchpad may have its own touchpad controller) that interfaces with chipset 402 through a wired or wireless connection (e.g., via communication interfaces(s) 403). In some cases, chipset 402 may also provide access to one or more user output devices (e.g., video projectors, paper printers, 3D printers, loudspeakers, audio headsets, Virtual/Augmented Reality (VR/AR) devices, etc.).

In certain embodiments, chipset 402 may further provide an interface for communications with one or more hardware sensors 413. Sensor(s) 413 may be disposed on or within the chassis of IHS 400, or otherwise coupled to IHS 400, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), accelerometer, etc.

Basic Input/Output System (BIOS) 414 is coupled to chipset 402. Unified Extensible Firmware Interface (UEFI) was designed as a successor to BIOS, and many modern IHSs utilize UEFI in addition to or instead of a BIOS. Accordingly, the term "BIOS" is also intended to also encompass a UEFI component. In operation, BIOS 414 provides an abstraction layer that allows the OS to interface with certain hardware components that are utilized by IHS 400.

Upon booting of IHS 400, host processor(s) 401 may utilize program instructions of BIOS 414 to initialize and test hardware components coupled to IHS 400, and to load host OS 202 for use by IHS 400. Via the hardware abstraction layer provided by BIOS 414, software stored in system memory 406 and executed by host processor(s) 401 can interface with certain I/O devices that are coupled to IHS 400.

Embedded Controller (EC) 415 (sometimes referred to as a Baseboard Management Controller or "BMC") includes a microcontroller unit or processing core dedicated to handling selected IHS operations not ordinarily handled by host processor(s) 401.

Examples of such operations may include, but are not limited to: power sequencing, power management, receiving and processing signals from a keyboard or touchpad, as well as operating chassis buttons and/or switches (e.g., power button, laptop lid switch, etc.), receiving and processing thermal measurements (e.g., performing cooling fan control, CPU and GPU throttling, and emergency shutdown), controlling indicator Light-Emitting Diodes or "LEDs" (e.g., caps lock, scroll lock, num lock, battery, ac, power, wireless LAN, sleep, etc.), managing a battery charger and a battery, enabling remote management, diagnostics, and remediation over an OOB or sideband network, etc.

Moreover, in various implementations, EC 415 may be configured to perform operations for accident detection and handling, as described in more detail below. For example, EC 415 may be configured with one or more Artificial Intelligence (AI)/Machine Learning (ML) models configured to detected, in firmware and autonomously with respect to the IHS's OS, whether an accident has taken place, to predict damage to the IHS caused by the accident, to assess contextual information required for evaluating policy rules, etc.

Unlike other devices in IHS 400, EC 415 may be operational from the very start of each power reset, before other devices are fully running or powered on. As such, EC 415 may be responsible for interfacing with a power adapter to manage the power consumption of IHS 400. These operations may be utilized to determine the power status of IHS 400, such as whether IHS 400 is operating from battery power or is plugged into an AC power source. Firmware instructions utilized by EC 415 may be used to manage other core operations of IHS 400 (e.g., turbo modes, maximum operating clock frequencies of certain components, etc.).

As described in more detail below, in various embodiments, EC 415 may be configured to perform a number of accident detection and handling operations, in some cases in dependently of the state of processor(s) 401, which may be in a, off, low power, sleep, or standby state (e.g., when IHS 400 is being carried with its lid closed, etc.).

EC 415 may also implement operations for detecting certain changes to the physical configuration or posture of IHS 400 and managing other devices in different configurations of IHS 400. For instance, when IHS 400 as a 2-in-1 laptop/tablet form factor, EC 415 may receive inputs from a lid position or hinge angle sensor 413, and it may use those inputs to determine: whether the two sides of IHS 400 have been latched together to a closed position or a tablet position, the magnitude of a hinge or lid angle, etc. In response to these changes, the EC may enable or disable certain features of IHS 400 (e.g., front or rear facing camera, etc.).

In this manner, EC 415 may identify any number of IHS postures, including, but not limited to: laptop, stand, tablet, or book. For example, when display(s) 405 of IHS 400 is open with respect to a horizontal keyboard portion, and the keyboard is facing up, EC 415 may determine IHS 400 to be in a laptop posture. When display(s) 405 of IHS 400 is open with respect to the horizontal keyboard portion, but the keyboard is facing down (e.g., its keys are against the top surface of a table), EC 415 may determine IHS 400 to be in a stand posture. When the back of display(s) 405 is closed against the back of the keyboard portion, EC 415 may determine IHS 400 to be in a tablet posture. When IHS 400 has two display(s) 405 open side-by-side, EC 415 may determine IHS 400 to be in a book posture. In some implementations, EC 415 may also determine if display(s) 405 of IHS 400 are in a landscape or portrait orientation.

In some implementations, EC 415 may be installed as a Trusted Execution Environment (TEE) component to the motherboard of IHS 400. Additionally, or alternatively, EC 415 may be further configured to calculate hashes or signatures that uniquely identify individual components of IHS 400. In such scenarios, EC 415 may calculate a hash value based on the configuration of a hardware and/or software component coupled to IHS 400. For instance, EC 415 may calculate a hash value based on all firmware and other code or settings stored in an onboard memory of a hardware component.

Hash values may be calculated as part of a trusted process of manufacturing IHS 400 and may be maintained in secure storage as a reference signature. EC 415 may later recalculate the hash value for a component and may compare it against the reference hash value to determine if any modifications have been made to the component, thus indicating that the component has been compromised. As such, EC 415 may validate the integrity of hardware and software components installed in IHS 400.

In addition, EC 415 may provide an OOB or sideband channel that allows an ITDM or Original Equipment Manufacturer (OEM) to manage IHS 400's various settings and configurations, for example, by issuing OOB commands.

In various embodiments, IHS 400 may be coupled to an external power source through an AC adapter, power brick, or the like. The AC adapter may be removably coupled to a battery charge controller to provide IHS 400 with a source of DC power provided by battery cells of a battery system in the form of a battery pack (e.g., a lithium ion or "Li-ion" battery pack, or a nickel metal hydride or "NiMH" battery pack including one or more rechargeable batteries).

Battery Management Unit (BMU) 416 may be coupled to EC 415 and it may include, for example, an Analog Front End (AFE), storage (e.g., non-volatile memory), and a microcontroller. In some cases, BMU 416 may be configured to collect and store information, and to provide that information to other IHS components, such as, for EC 415 and/or other devices.

Examples of information collectible by BMU 416 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), etc.

In some embodiments, IHS 400 may not include all the components shown in FIG. 4. In other embodiments, IHS 400 may include other components in addition to those that are shown in FIG. 4. Furthermore, some components that are represented as separate components in FIG. 4 may instead be integrated with other components, such that all or a portion of the operations executed by the illustrated components may instead be executed by the integrated component.

For instance, in various embodiments, host processor(s) 401 and/or other components shown in FIG. 4 (e.g., chipset 402, display controller(s) 404, communication interface(s) 403, EC 415, etc.) may be replaced by devices within heterogenous computing platform 200 (FIG. 2). As such, IHS 400 may assume different form factors including, but not limited to: servers, workstations, desktops, laptops, appliances, video game consoles, tablets, smartphones, etc.

Historically, IHSs with desktop and laptop form factors have had conventional host OSs executed on INTEL or AMD's "x86"-type processors. Other types of processors, such as ARM processors, have been used in smartphones and tablet devices, which typically run thinner, simpler, or mobile OSs (e.g., ANDROID, IOS, WINDOWS MOBILE, etc.).

More recently, however, IHS manufacturers have started producing fully-fledged desktop and laptop IHSs equipped with ARM-based, heterogeneous computing platforms, and host OSs (e.g., WINDOWS on ARM) have been developed to provide users with a more quintessential OS experience on those platforms. As such, in various embodiments described herein, a heterogeneous computing platform may include an integrated EC and/or it may communicate with an external EC via a bridge or the like.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

The term "firmware," as used herein, refers to a class of program instructions that provides low-level control for a device's hardware. Generally, firmware enables basic functions of a device and/or provides hardware abstraction services to higher-level software, such as an Operating System (OS) (e.g., WINDOWS, LINUX, MAC OS, etc.). The term "firmware service," as used herein, refers to program instructions that, upon execution by a processing core, deploys services configured to operate without any involvement by the OS.

The term "telemetry data," as used herein, refers to information resulting from in situ collection of measurements or other data by devices within a heterogenous computing platform, or any other IHS device or component, and its transmission (e.g., automatically) to a receiving entity, for example, for accident detection or monitoring purposes. Examples of telemetry data may include, but are not limited to, measurements, metrics, logs, and/or other contextual information related to: whether or how the IHS is moving (e.g., velocity and/or acceleration), a location of the IHS, a bag state (whether the IHS is inside a bag or case), etc.

An example method for updating a Basic Input/Output System (BIOS) for an Information Handling System (IHS) comprises receiving a BIOS image with appended metadata, extracting at least a portion of the metadata from the BIOS image, communicating information about metadata contents to an embedded controller via a telemetry service, evaluating prerequisites in the metadata against a current BIOS and IHS status, initiating a BIOS update if the prerequisites are satisfied, communicating information regarding BIOS update progress to the embedded controller via the telemetry service, and determining whether the BIOS update was successful after rebooting the IHS. The metadata may include one or more of the following segments: signed information, a metadata format version, a source application identifier, an application version, a timestamp, a minimum BIOS version required, a minimum Operating System (OS) security score, criticality information, and an additional software list.

In some embodiments of the method, the BIOS image with appended metadata is received by an IHS Operating System (OS) via a software update application. In some embodiments of the method, the BIOS image with appended metadata is received by an IHS Operating System (OS) via an Over The Air (OTA) software update service.

In some embodiments method includes verifying the contents of the metadata using signed information in the metadata.

In some embodiments of the method, the embedded controller manages a BIOS update process.

In some embodiments the method includes reporting BIOS update progress and BIOS update events to a backend service.

In some embodiments the method includes determining that the prerequisites are not satisfied; and initiating one or more remediations to conform a current BIOS and a current Operating System (OS) to meet the prerequisites.

In some embodiments the method includes receiving notice that a user has not allowed the BIOS update, determining whether to prompt the user to reinitiate the BIOS update based on criticality of the update, and scheduling a BIOS update retry attempt with the user.

In some embodiments the method includes determining that the BIOS update was not successful, initiating corrective actions to address a cause of BIOS update failure, and initiating one or more BIOS update retry attempts. The method may further comprise determining a cause of BIOS update failure locally at the IHS, and initiating the corrective actions at the IHS.

In some embodiments the method includes reporting BIOS update events to a backend service, determining a cause of a BIOS update failure at the backend service, and initiating the corrective actions at the backend service.

In some embodiments the method includes identifying one or more additional software applications listed in the metadata, and downloading the additional software applications via a software update service.

In example embodiment, an Information Handling System (IHS) comprises a processor, an embedded controller, and a memory coupled to the processor. The memory has program instructions stored thereon that, upon execution by the processor, cause an Operating System (OS) to receive a BIOS image with appended metadata, extract at least a portion of the metadata from the BIOS image, communicate information about metadata contents to the embedded controller via a telemetry service, evaluate prerequisites in the metadata against a current BIOS and OS status, initiate a BIOS update if the prerequisites are satisfied, communicate information regarding BIOS update progress to the embedded controller via the telemetry service, determine that the BIOS update was not successful, initiate corrective actions to address a cause of BIOS update failure, and initiate one or more BIOS update retry attempts.

The metadata may include one or more of the following segments: signed information, metadata format version, source application identifier, application version, timestamp, minimum BIOS version required, minimum OS security score, criticality, and additional software list.

The program instructions may further cause the OS to verify the contents of the metadata using signed information in the metadata.

The embedded controller may be configured to manage a BIOS update process.

The telemetry service may be configured to report BIOS update progress and BIOS update events to a backend service.

The program instructions may further cause the OS to identify one or more additional software applications listed in the metadata, and download the additional software applications via a software update service.

The program instructions may further cause the OS to determine that the BIOS image is a critical update, and prompt a user to reinitiate the BIOS update based on criticality of the update.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method for updating a Basic Input/Output System (BIOS) for an Information Handling System (IHS), comprising:

receiving a BIOS image with appended metadata, wherein the appended metadata comprises signed information, a metadata format version, a source application identifier, an application version, a timestamp, a minimum BIOS version required, a minimum Operating System (OS) security score, criticality information, and an additional software list;

extracting at least a portion of the metadata from the BIOS image;

communicating information about metadata contents, including the source application identifier and the criticality information, to an embedded controller via a telemetry service, wherein the embedded controller tracks that the BIOS image has been delivered, a source or delivery vehicle of the BIOS image, the criticality information, and that the IHS is about to attempt installing the BIOS image;

evaluating prerequisites in the metadata, including the minimum BIOS version required and the minimum OS security score, against a current BIOS version, a current security score of an OS executing on the IHS, and IHS status;

initiating a BIOS update if the prerequisites are satisfied;

communicating information regarding BIOS update progress to the embedded controller via the telemetry service; and determining whether the BIOS update was successful after rebooting the IHS.

2. The method of claim 1, wherein the appended metadata comprises signed metadata added as an overlay on a binary image of the BIOS image, wherein the source application identifier is configured to identify a source application that created or provided the appended metadata and is associated with a globally unique identifier (GUID), and wherein the metadata format version is configured to identify a format used to compile and organize the appended metadata.

3. The method of claim 1, wherein the BIOS image with appended metadata is received by an IHS Operating System (OS) via a software update application.

4. The method of claim 1, wherein the BIOS image with appended metadata is received by an IHS Operating System (OS) via an Over The Air (OTA) software update service.

5. The method of claim 1, further comprising:

before communicating information about metadata contents and before evaluating prerequisites, verifying the contents of the metadata using signed information in the metadata, wherein the signed information in the metadata comprises a signed-information segment configured to authenticate a validity and/or source of the metadata, and wherein the verified contents include at least the source application identifier, the minimum BIOS version required, the minimum OS security score, the criticality information, and the additional software list.

6. The method of claim 1, wherein the embedded controller manages a BIOS update process.

7. The method of claim 1, further comprising:

reporting BIOS update progress and BIOS update events to a backend service.

8. The method of claim 1, further comprising:

determining that the prerequisites are not satisfied; and initiating one or more remediations to conform a current BIOS and a current Operating System (OS) to meet the prerequisites.

9. The method of claim 1, further comprising:

receiving notice that a user has not allowed the BIOS update;

determining whether to prompt the user to reinitiate the BIOS update based on criticality of the update; and scheduling a BIOS update retry attempt with the user.

10. The method of claim 1, further comprising:

determining that the BIOS update was not successful;

initiating corrective actions to address a cause of BIOS update failure; and initiating one or more BIOS update retry attempts.

11. The method of claim 10, further comprising:

determining a cause of BIOS update failure locally at the IHS; and initiating the corrective actions at the IHS.

12. The method of claim 10, further comprising:

reporting BIOS update events to a backend service;

determining a cause of a BIOS update failure at the backend service; and initiating the corrective actions at the backend service.

13. The method of claim 1, further comprising:

identifying one or more additional software applications listed in the metadata; and downloading the additional software applications via a software update service.

14. An Information Handling System (IHS), comprising:

a processor;

an embedded controller; and a memory coupled to the processor, the memory configured with program instructions stored thereon that, upon execution by the processor, cause an Operating System (OS) to:

receive a BIOS image with appended metadata, wherein the appended metadata comprises signed information, a metadata format version, a source application identifier, an application version, a timestamp, a minimum BIOS version required, a minimum OS security score, criticality information, and an additional software list;

extract at least a portion of the metadata from the BIOS image;

communicate information about metadata contents, including the source application identifier and the criticality information, to the embedded controller via a telemetry service, wherein the embedded controller is configured to track that the BIOS image has been delivered, a source or delivery vehicle of the BIOS image, the criticality information, and that the IHS is about to attempt installation of the BIOS image;

evaluate prerequisites in the metadata, including the minimum BIOS version required and the minimum OS security score, against a current BIOS version, a current security score of the OS, and OS status;

initiate a BIOS update if the prerequisites are satisfied;

communicate information regarding BIOS update progress to the embedded controller via the telemetry service;

determine that the BIOS update was not successful;

initiate corrective actions to address a cause of BIOS update failure; and initiate one or more BIOS update retry attempts.

15. The IHS of claim 14, wherein BIOS content is stored within an Extensible Firmware Interface (EFI) system partition (ESP), and wherein the program instructions further cause the at least a portion of the metadata to be securely extracted from zipped BIOS content based at least in part on an extractor.

16. The IHS of claim 14, wherein the program instructions further cause the OS to:

before communication of the information about metadata contents to the embedded controller and before evaluation of the prerequisites, verify the contents of the metadata based at least in part on signed information in the metadata, wherein the signed information in the metadata comprises a signed-information segment configured to authenticate a validity and/or source of the metadata, and wherein the verified contents include at least the source application identifier, the minimum BIOS version required, the minimum OS security score, the criticality information, and the additional software list.

17. The IHS of claim 14, wherein the embedded controller is configured to manage a BIOS update process.

18. The IHS of claim 14, wherein the telemetry service is configured to report BIOS update progress and BIOS update events to a backend service.

19. The IHS of claim 14, wherein the program instructions further cause the OS to:

identify one or more additional software applications listed in the metadata; and download the additional software applications via a software update service.

20. The IHS of claim 14, wherein the program instructions further cause the OS to:

determine that the BIOS image is a critical update; and prompt a user to reinitiate the BIOS update based on criticality of the update.

* * * * *